US007472961B2

(12) United States Patent
Schwartz et al.

(10) Patent No.: US 7,472,961 B2

(45) Date of Patent: Jan. 6, 2009

(54) WOVEN ARTICLES FROM SYNTHETIC YARNS

(75) Inventors: Larry Schwartz, Boca Raton, FL (US); Coley Chris Mathis, Dothan, AL (US); Cynthia F. Caudle, Franklin, TN (US)

(73) Assignee: Casual Living Worldwide, Inc., Louisville, KY (US)

( * ) Notice: Subject to any disclaimer, the term of this patent is extended or adjusted under 35 U.S.C. 154(b) by 39 days.

(21) Appl. No.: 10/902,556

(22) Filed: Jul. 29, 2004

(65) Prior Publication Data

US 2005/0106966 A1 May 19, 2005

Related U.S. Application Data

(60) Provisional application No. 60/520,959, filed on Nov. 18, 2003.

(51) Int. Cl.
*A47C 5/02* (2006.01)
*B32B 27/30* (2006.01)

(52) U.S. Cl. .............................. 297/451.9; 297/452.64; 442/62; 442/63; 442/68; 442/155; 442/173

(58) Field of Classification Search ................... 442/62, 442/63, 68, 155, 173; 279/452.64
See application file for complete search history.

(56) References Cited

U.S. PATENT DOCUMENTS

| | | | |
|---|---|---|---|
| D13,544 | S | 1/1883 | Remington |
| D13,545 | S | 1/1883 | Remington |
| 366,743 | A | 7/1887 | Siegenthaler |
| D18,589 | S | 9/1888 | Schuck |
| D30,125 | S | 1/1899 | Moulton |
| 679,978 | A | 8/1901 | Merrick |
| D93,567 | S | 10/1934 | Moore |
| 2,253,000 | A | 8/1941 | Francis |
| 2,313,058 | A | 3/1943 | Francis |
| 2,321,746 | A | 6/1943 | Heymann |
| 2,348,230 | A | 5/1944 | Spielmann |
| 2,401,291 | A | 5/1946 | Smith |
| D151,042 | S | 9/1948 | Harrison |
| 2,450,948 | A | 10/1948 | Foster |
| 2,713,360 | A | 7/1955 | Bloch |
| 2,721,848 | A | 10/1955 | Vitalis |

(Continued)

FOREIGN PATENT DOCUMENTS

| | | |
|---|---|---|
| DE | 19516174 | 11/1996 |

(Continued)

OTHER PUBLICATIONS

Kathryn L. Hatch, Textile Science, 1993 West Publishing Co., 1st Edition, pp. 119-120.

(Continued)

*Primary Examiner*—Arti Singh
(74) *Attorney, Agent, or Firm*—Lerner, David, Littenberg, Krumholz & Mentlik, LLP

(57) ABSTRACT

A woven panel is formed from a plurality of elongated yarns, with and without a center core. The core yarns provide mechanical strength for the woven material in supporting the coreless yarns when used in load bearing articles such as the seat or back portions of an article of furniture.

29 Claims, 6 Drawing Sheets

U.S. PATENT DOCUMENTS

| | | | | |
|---|---|---|---|---|
| 3,001,354 | A | 9/1961 | Davis | |
| 3,012,303 | A | 12/1961 | Whitaker et al. | |
| 3,018,610 | A | 1/1962 | Kleinekatopher | |
| 3,050,431 | A | 8/1962 | Crandall | |
| 3,101,522 | A | 8/1963 | Hooper et al. | |
| 3,109,278 | A | 11/1963 | Gibson | |
| 3,233,648 | A | 2/1966 | Kovac et al. | |
| 3,343,242 | A | 9/1967 | De Witte | |
| 3,488,934 | A | 1/1970 | MacDonald | |
| 3,559,390 | A | 2/1971 | Staschewski | |
| 3,645,819 | A | 2/1972 | Fuiji et al. | |
| 3,671,381 | A | 6/1972 | Hansen | |
| 3,686,845 | A | 8/1972 | Okada et al. | |
| 3,691,748 | A | 9/1972 | Buzano | |
| 3,761,346 | A | 9/1973 | Caroselli et al. | |
| 3,763,640 | A | 10/1973 | Nagel et al. | |
| 3,792,899 | A | 2/1974 | Rocchia et al. | |
| 3,828,544 | A | 8/1974 | Alker et al. | |
| 3,839,854 | A | 10/1974 | Carranza et al. | |
| 3,867,967 | A | 2/1975 | Rochhia et al. | |
| 3,911,186 | A * | 10/1975 | Trotman | 428/137 |
| 3,948,702 | A | 4/1976 | Theissen | |
| 3,958,406 | A | 5/1976 | Corbiere | |
| 4,026,098 | A | 5/1977 | Bosley | |
| 4,114,549 | A | 9/1978 | Chambley et al. | |
| 4,122,658 | A | 10/1978 | Morioka et al. | |
| 4,123,893 | A | 11/1978 | Chambley et al. | |
| 4,155,394 | A | 5/1979 | Shepherd et al. | |
| 4,164,836 | A | 8/1979 | Tanae et al. | |
| 4,168,606 | A | 9/1979 | Callander | |
| 4,172,910 | A | 10/1979 | Rotar | |
| 4,197,345 | A | 4/1980 | Worrall | |
| 4,218,869 | A | 8/1980 | Newton | |
| 4,231,834 | A | 11/1980 | Trejo Gonzalez | |
| 4,243,713 | A | 1/1981 | Worrall et al. | |
| 4,246,747 | A | 1/1981 | Plunkett et al. | |
| 4,275,117 | A | 6/1981 | Crandall | |
| 4,289,564 | A | 9/1981 | Hanaford et al. | |
| 4,295,235 | A | 10/1981 | Deitz | |
| 4,378,725 | A | 4/1983 | Hospers et al. | |
| 4,395,029 | A | 7/1983 | Davis et al. | |
| 4,416,934 | A | 11/1983 | Kimura et al. | |
| 4,442,664 | A | 4/1984 | Schmitt et al. | |
| 4,467,839 | A | 8/1984 | Westhead | |
| 4,469,738 | A | 9/1984 | Himelreich, Jr. | |
| 4,475,330 | A | 10/1984 | Kimura et al. | |
| 4,495,244 | A | 1/1985 | Phillips | |
| 4,521,362 | A | 6/1985 | Tassone | |
| 4,544,594 | A | 10/1985 | Li et al. | |
| 4,559,772 | A | 12/1985 | Heinrich et al. | |
| 4,574,107 | A | 3/1986 | Ferrari et al. | |
| 4,582,741 | A | 4/1986 | Tassone | |
| 4,586,751 | A | 5/1986 | McGuire | |
| 4,587,997 | A | 5/1986 | Brooks | |
| 4,626,390 | A | 12/1986 | Li et al. | |
| 4,628,682 | A | 12/1986 | Buzano et al. | |
| 4,639,397 | A | 1/1987 | Sato et al. | |
| 4,719,136 | A | 1/1988 | Zwirner et al. | |
| 4,736,578 | A | 4/1988 | Shaffer | |
| 4,744,935 | A | 5/1988 | Priaroggia et al. | |
| 4,798,581 | A | 1/1989 | Jessup | |
| 4,903,472 | A | 2/1990 | Vanhelle et al. | |
| 4,934,008 | A | 6/1990 | McBride Daniel Taylor | |
| 4,960,349 | A | 10/1990 | Willibey et al. | |
| 4,973,510 | A | 11/1990 | Tanaka et al. | |
| 5,084,221 | A | 1/1992 | Matsuno et al. | |
| 5,091,030 | A | 2/1992 | Nelson | |
| 5,094,068 | A | 3/1992 | Hirao | |
| 5,200,261 | A | 4/1993 | Taguchi et al. | |
| 5,284,380 | A | 2/1994 | Gehry | |
| 5,336,562 | A | 8/1994 | Forero et al. | |
| 5,422,388 | A | 6/1995 | Patel et al. | |
| 5,507,997 | A | 4/1996 | Evain | |
| 5,585,182 | A | 12/1996 | Aneja et al. | |
| 5,607,761 | A | 3/1997 | Christensen et al. | |
| 5,700,490 | A | 12/1997 | Meise | |
| 5,704,690 | A | 1/1998 | Schwartz | |
| D395,171 | S | 6/1998 | Schwartz | |
| 5,794,427 | A | 8/1998 | Cavedon et al. | |
| 5,807,794 | A | 9/1998 | Knox et al. | |
| 5,829,241 | A | 11/1998 | McAllister et al. | |
| 5,834,119 | A | 11/1998 | Roop | |
| 5,845,970 | A | 12/1998 | Schwartz | |
| 5,858,885 | A | 1/1999 | Hamilton et al. | |
| 5,879,792 | A * | 3/1999 | Watanabe et al. | 428/304.4 |
| D409,001 | S | 5/1999 | Schwartz | |
| 5,925,727 | A | 7/1999 | Onda et al. | |
| 5,972,514 | A | 10/1999 | D'Herbercourt | |
| 5,994,242 | A | 11/1999 | Arthurs et al. | |
| 6,035,901 | A | 3/2000 | Stumpf et al. | |
| 6,074,751 | A | 6/2000 | Murakami et al. | |
| 6,117,548 | A | 9/2000 | Swers et al. | |
| 6,120,097 | A | 9/2000 | Perry et al. | |
| 6,179,382 | B1 * | 1/2001 | Schwartz | 297/239 |
| 6,209,951 | B1 | 4/2001 | Han | |
| 6,244,031 | B1 | 6/2001 | Murakami et al. | |
| 6,264,674 | B1 | 7/2001 | Washington et al. | |
| 6,269,525 | B2 | 8/2001 | Dischler et al. | |
| 6,426,141 | B1 | 7/2002 | Mathis et al. | |
| 6,475,047 | B2 | 11/2002 | Cynamon | |
| 6,601,723 | B1 | 8/2003 | Ziglar | |
| 6,705,070 | B2 | 3/2004 | Schwartz | |
| 6,855,420 | B2 | 2/2005 | Johnson et al. | |
| 6,935,383 | B2 | 8/2005 | Schwartz | |
| 2001/0039158 | A1 | 11/2001 | Swers et al. | |
| 2002/0144497 | A1 | 10/2002 | Scheunemann | |
| 2003/0101708 | A1 | 6/2003 | Schwartz | |
| 2005/0009430 | A1 | 1/2005 | Tsung-Yueh | |

FOREIGN PATENT DOCUMENTS

| | | | |
|---|---|---|---|
| EA | 03732311 | | 6/1990 |
| EP | 0 073 090 | | 3/1983 |
| EP | 0210710 | | 2/1987 |
| FR | 796 996 | | 4/1936 |
| GB | 1047156 | | 11/1980 |
| GB | 2 213 842 | | 8/1989 |
| JP | 56-17353 | A | 2/1981 |
| JP | 57133212 | | 8/1982 |
| JP | 58098437 | A | 6/1983 |
| JP | 63-93379 | A | 4/1988 |
| JP | 11179705 | | 7/1999 |
| WO | WO 0138629 | A1 | 5/2001 |

OTHER PUBLICATIONS

Steven B. Warner, Fiber Science, 1995 Prentice-Hall, Inc., 1st Edition, p. 237.
Technical Data, PVC Plastikote Paint, 2 pages.
COSH, Material Safety Data Sheet, PVC Plastikote Paint, 3 pages.
Material Safety Data Sheet, PVC Clear Cement, 3 pages.
Material Safety Data Sheet, Wet/Dry Blue PVC Cement, 4 pages.
Material Safety Data Sheet, KRylon Fusion, 6 pages.
Citation from Metals Abstracts (1-40).
Fisher-Price Hideaway Hollows (1997).
Woven Fiber Furniture, Lloyd Loom, (1991) pp. 45-64, 148-149.
Technical Data, PVC Plastikote Paint, 2 pagess, date unknown.
COSH, Material Safety Data Sheet, PVC Plastikote Paint, 3 pages, date unknown.
Material Safety Data Sheet, 3 pages, date unknown.
Material Safety Data Sheet, 4 pages, date unknown.
Material Safety Data Sheet, 6 pages, date unknown.
Citation from Metals Abstracts (40), date unknown.
Office Action for U.S. Appl. No. 11/654,105, mailed Aug. 27, 2008.

* cited by examiner

WOVEN ARTICLES FROM SYNTHETIC YARNS

CROSS REFERENCES TO RELATED APPLICATIONS

This application claims the benefit of the filing date of U.S. Provisional Patent Application No. 60/520,959 filed Nov. 18, 2003, the disclosure of which is incorporated herein by reference.

BACKGROUND OF THE INVENTION

Natural wicker has been used in the manufacture of furniture, baskets and other articles for many centuries. The casual, informal appearance of wicker has made it especially popular for use in enclosed porches and other informal settings in homes, hotels and other establishments. Natural wicker, however, has had limited use in the outdoor furniture market, including patio furniture, pool furniture and the like. This is because natural wicker softens and weakens when wet, and is more susceptible to rotting and mildew than many other natural and man-made furniture materials.

Woven wicker typically comprises a weft yarn, i.e., a yarn running straight through the woven material, and a warp yarn, i.e., a yarn that is woven around the weft yarn. Numerous styles of weave are used in the manufacture of wicker furniture. The various styles of weave result in a different look, feel, strength and weight of the finished woven product. In a simple weave pattern, the weft yarns are spaced apart and arranged parallel to each other. The warp yarns are woven over and under alternating weft yarns. Adjacent warp yarns pass on opposite sides of a given weft yarn.

Polymer yarns have also been used to manufacture wicker-like furniture. By way of example, a polymer yarn is known which is constructed as an elongated body, such as of indeterminate length, having a core surrounded by a sheath of polyvinylchloride (PVC) outer coating, for example, foamed and non foamed PVC material. Foamed PVC material gives greater volume with less material. The outer coating may be formed of other synthetic materials such as polyamides, polyesters and the like. The yarn is typically made in a single step using a coextrusion process, as is known in the art. The inner core may include a single filament of polyester, or may include a plurality of polyester filaments bundled to form a single core. In addition, the core may be formed of other materials than polyester such as metal, monofilament or stranded, such as polyamides and the like. The core is designed to give the yarn greater mechanical strength over yarns formed only of polymer material. This is considered more important when the outer layer is constructed from foamed polymer material.

The polymer yarn being constructed from foamed PVC material results in a lack of uniformity in the foaming of the PVC material during the extrusion process. This produces a yarn which lacks a uniform cylindrical appearance. Specifically, the outer surface of the yarn is deformed, such as by having undulations, mounds and/or depressed areas along the length of the yarn. The deformed shape of the outer surface of the yarn results in the yarn having a more natural look to that of real wicker. It is also known to provide the exterior surface of the polymer yarn with one or more random stripes of a contrasting color and/or one or more random grooves. The stripes and grooves can be continuous and/or intermittent along the exterior surface of the yarn. The yarn, however, can also have a more uniform cylindrical shape, as well as other shapes such as square, oval, flat, triangular and the like. Polymer yarns as thus far described are known from U.S. Pat. Nos. 5,704,690, 5,845,970 and 6,179,382; as well as U.S. Design Pat. Nos. 395,171, 474,614 and 409,001; the disclosures of which are incorporated herein by reference. As in the case of natural wicker, polymer yarns have been woven into a woven material, which has been used in the manufacture of casual furniture suitable for the outdoor furniture market, including patio furniture, as well as for indoor use.

There is known twisted composite yarns for use in manufacturing synthetic woven material for furniture articles in Applicant's U.S. Pat. Nos. 6,625,970, 6,705,020 and 6,725,640, the disclosures of which are incorporated herein by reference. These patents disclose various methods of heat setting multiple strand twisted yarns and forming same into a woven material for use in forming, for example, seat and back portions of a furniture article. The twisted yarns are used as both the weft yarns and the warp yarns to form the woven portion, which is adhered to a frame of a furniture article. There is also disclosed the application of multiple strands twisted and single strand non-twisted synthetic yarns for use in manufacturing synthetic woven material for furniture articles in Applicant's co-pending application Ser. No. 10/158,629, entitled "Combination Weave Using Twisted and Non-Twisted Yarn" which was filed on May 30, 2002, the disclosure of which is also incorporated herein by reference. This latter application discloses various methods of providing a more comfortable seat portion through the use of non-twisted yarn strands as the warp yarns.

The aforementioned also disclose forming a weave from various combinations of twisted and/or non-twisted synthetic yarns which are adhered prior to or after the weaving process to the frame of an article of furniture. The woven synthetic material is subsequently heat set by placing the article of furniture having the weave thereon into an oven in accordance with the disclosed process. The heat setting process stabilizes the weft and warp yarns to inhibit their shifting within the weave, as well as heat setting individual twisted strands of polymer yarn which may be used as the weft and warp yarns. It has been observed, however, that the heat setting process results in elongation of the polymer strands causing sagging of the woven panels particularly in the seat and back rest portions which span an unsupported area of the article frame. Although the slight sagging of the polymer woven material does not affect the usability of the furniture article, it detracts from the aesthetic appeal of the article to the consumer.

It is therefore desirable to provide improvements in the manufacture of polymer woven material for use in furniture articles and accessories therefore including, for example, the use of twisted strands of polymer yarn and heat set woven material therefrom.

SUMMARY OF THE INVENTION

In accordance with one embodiment of the present invention, there is described a coated woven panel comprising a plurality of polymer first yarns woven together with a plurality of polymer second yarns forming a woven panel therefrom, the first and second yarns having an exposed outer surface and interstices therebetween within the woven panel, a coating having a color covering at least a portion of the exposed outer surface of the first and second yarns and within the interstices.

In accordance with another embodiment of the present invention, there is described an article of furniture comprising a frame having the shape of an article of furniture, and a woven panel attached to the frame, the woven panel comprises a plurality of polymer first yarns woven together with a plurality of polymer second yarns forming a woven panel therefrom, the first and second yarns having an exposed outer surface and interstices therebetween within the woven panel, a coating having a color covering at least a portion of the exposed outer surface of the first and second yarns and within the interstices.

In accordance with another embodiment of the present invention, there is described a method of making a coated woven panel comprising forming a woven panel by weaving together a plurality of first polymer yarns with a plurality of polymer second yarns, the first and second yarns having an exposed outer surface and interstices therebetween with the woven panel, and coating at least a portion of the exposed outer surface of the first and second yarns and within the interstices with a colored coating composition.

In accordance with another embodiment of the present invention, there is described a method of making an article of furniture comprising providing a frame having the shape of an article of furniture and attaching a woven panel to the frame, the woven panel formed by weaving together a plurality of first polymer yarns with a plurality of polymer second yarns, the first and second yarns having an exposed outer surface and interstices therebetween within the woven panel, and coating at least a portion of the exposed outer surface of the first and second yarns and within the interstices with a colored coating composition.

In accordance with another embodiment of the present invention, there is described a method of bonding together a plurality of polymer yarns, the method comprising weaving a plurality of polymer yarns into a weave having interstices; at least partially filling the interstices with a coating composition; and applying a solvent for the polymer yarns or thinner for the composition within the interstices.

In accordance with another embodiment of the present invention, there is described a method of bonding together a plurality of twisted polymer yarns, the method comprising providing a weave of a plurality of twisted polymer yarns having interstices within the weave; at least partially filling the interstices with a coating composition; and applying a fluid at least within the interstices.

In accordance with another embodiment of the present invention, there is described a method of making a weave having a washed out appearance, the method comprising weaving a plurality of polymer yarns into a weave; applying a colored composition to the plurality of polymer yarns within the weave; and removing at least a portion of the colored composition from the plurality of polymer yarns.

BRIEF DESCRIPTION OF THE DRAWINGS

The above description, as well as further objects, features and advantages of the present invention will be more fully understood with reference to the following detailed description of Woven Articles from Synthetic Yarns, when taken in conjunction with the accompanying drawings, wherein.

DETAILED DESCRIPTION

In describing the preferred embodiments of the subject matter illustrated and to be described with respect to the drawings, specific terminology will be resorted to for the sake of clarity. However, the invention is not intended to be limited to the specific terms so selected, and is to be understood that each specific term includes all technical equivalence which operate in a similar manner to accomplish a similar purpose.

Figure 1:
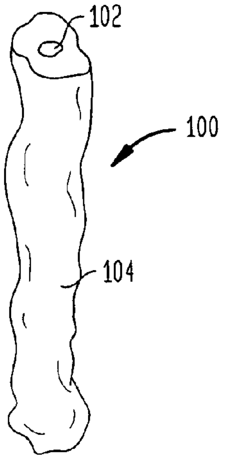
FIG. 1 is a top plan view of a portion of a single strand of a polymer yarn in accordance with one embodiment.

Referring to the drawings, wherein like reference numerals represent like elements, there is shown in FIG. 1 in accordance with an embodiment of the present invention a single strand of yarn preferably of PVC material of indeterminate length designated generally by reference numeral 100. In the preferred embodiment, the yarn 100 has a core 102 of polyester material or metal as previously described surrounded by a polymer sheath 104 of polymer material such as PVC material. The core 102 may be centered or eccentric within the sheath 104. The yarn 100 may be made as a single strand of polymer material of the type and construction as described in the aforementioned patents which have been incorporated herein by reference. As such, the yarn 100 may have a uniform outer surface and/or cross-section, or one which is deformed along its outer surface and has a non-uniform cross-section over its length, and one in which the outer sheath 104 is foamed or not foamed. However, other sheaths 104 or cores 102 of polymer material of a different construction or polymer material are also contemplated for use in producing a yarn 100 and a weave of woven material in accordance with the present invention.

Figure 2:
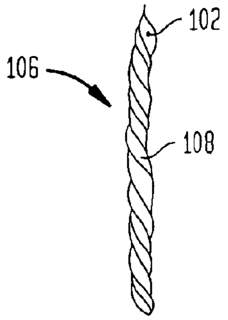
FIG. 2 is a top plan view of a self-twisted polymer yarn in accordance with another embodiment.

There is shown in FIG. 2 in accordance with another embodiment of the present invention a single strand of a twisted yarn preferably of PVC material of indeterminate length designated generally by reference numeral 106. The yarn 106 also has a core 102 of polyester material as previously described surrounded by an outer sheath 106. As such, the yarn 106 may have a uniform outer surface and/or cross-section, or one which is deformed along its outer surface and has a non-uniform cross-section over its length, and one in which the outer sheath 108 is foamed or not foamed. However, other sheaths 108 of polymer material of a different construction or polymer material are also contemplated for use in producing a self-twisted yarn 106 and a weave of woven material in accordance with the present invention. The twisted yarn 106 may also be referred to herein as a self-twisted yarn 106 or a single twisted yarn 106.

Yarns 100, 106 can be of any shape, size, surface ornamentation and/or color. For example, the yarns 100, 106 may be flat, oval, square, rectangular, polygonal, etc. It is also contemplated that any variation of the yarns 100, 106 can be utilized in forming a woven portion. By way of one example, the yarn 100, 106 may be co-extruded from polymer material of different colors. In this regard, a portion of the yarn 100, 106 extending longitudally along its length may be one color, and other portions co-extruded of different colors or polymer material. When the yarn 100 is twisted, the varying colors will provide the self-twisted yarn 106 with a unique ornamental appearance of twisted multi-colored yarns notwithstanding that only a single yarn is used. Thus, it is to be understood, that various constructions of polymer yarns 100, 106 as described may be woven to form a woven material having various aesthetic appearances.

Figure 3:
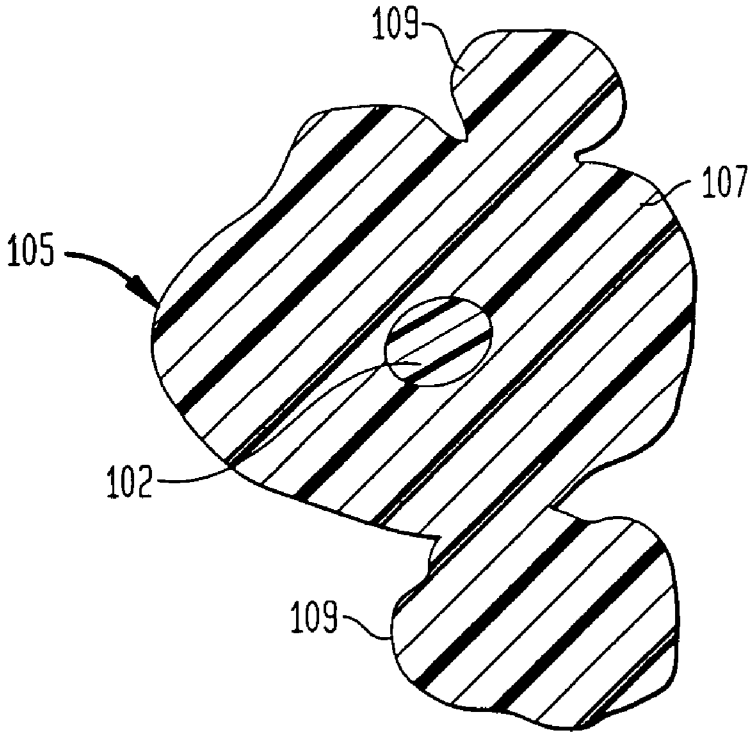
FIG. 3 is a cross-sectional view of a polymer yarn having nodes in accordance with another embodiment.

Referring to FIG. 3, there is shown another embodiment of a strand of a yarn 105 having a main outer sheath or layer 107 and a central core 102 similar in construction to yarns 100/106. The yarn 105 is further provided with one or more protrusions or nodes 109 which may be formed contemporaneously with formation, e.g., co-extrusion, of the yarn 105. The protrusions 109 may be of any shape or size desired. In this regard, it is contemplated that the protrusions 109 will be of different size than the main outer layer 107 of the yarn 105. However, it is also contemplated that each of the protrusions 109 may have a similar shape to the main outer layer 107, each of the protrusions 109 being of the same or different size with respect to each other.

Any number of protrusions 109 may be co-extruded with the main outer layer 107. It is also contemplated that the color of the protrusions 109 may be different from each other, as well as being different from the main outer layer 107 of the yarn 105. It is further contemplated that the protrusions 109 may or may not include a core 102. It is still further contemplated that the protrusions 109 may have any surface ornamentation, contour, grooves, lines or the like as may be desired, which may or may not be included on the surface of the main outer layer 107. The protrusions 109 will provide additional texture to the yarn 105. Furthermore, by providing the protrusions 109 of different colors, as well as being of a different color to the main outer layer 107 of the yarn 105, a unique aesthetic appearance will be provided to the strand upon twisting and weaving into a woven material. It is further contemplated that the protrusions 109 can be co-extruded along the entire length of the yarn 105. However, it is also contemplated that the protrusions 109 may be longitudal segments of varying lengths along the longitudinal outer surface of the yarn 105.

Figure 4:
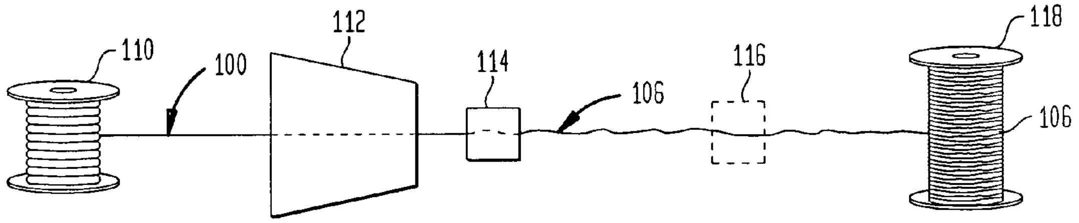
FIG. 4 is a diagrammatic illustration showing one fabrication process for a self-twisted polymer yarn.

Referring now to FIG. 4, there will be described one process of manufacturing a self-twisted yarn 106 from a non-twisted yarn 100. As shown, there is provided a source 110 of a continuous length of a single yarn 100 of polymer material. Generally, the source 110 will be in the nature of a spool of an indeterminate length yarn 100 of the polymer material. It is contemplated, however, that the source 110 can be any apparatus suitable for retaining the yarn 100 and feeding the yarn to conduct the process herein. The yarn may also be provided directly from an extruder.

The individual yarn 100 may initially be fed from the spool into an oven 112 which is heated to a predetermined temperature. In the case of PVC material, an oven temperature in one example of about 270° F. is contemplated. The function of heating the yarn 100 is to reduce its memory retention properties so as to inhibit the yarn from untwisting prior to weaving. However, the heating process is not essential or required of the present invention, and if used, can be accomplished at other oven temperatures. The temperature of the oven 112 will generally take into consideration the type of the polymer material forming the yarn 100, as well as the linear rate in which the yarn passes through the oven 112, for example, the residence time in the oven 112. Based upon the oven temperature and residence time of the yarn 100 within the oven 112, the yarn can be heated to a temperature to relieve or reduce its memory properties. For example, typically below its softening temperature, although higher temperatures are contemplated. Accordingly, lower temperatures with longer residence times and higher temperatures with shorter residence times are contemplated. It is to be understood that the higher temperature of the yarn, the greater likelihood and degree of adherence or bonding between the yarn when twisted or attained when heated after twisting.

It can be appreciated that the temperature of the oven will vary according to the particular polymer material forming the strand 100, as well as the degree of memory relief desired of the strand 100. For polymer material most suitable for use in accordance with the present invention, a temperature range of 200 to 450° F., and more preferably about 250 to 375° F. is contemplated. However, as the basis for determining the oven temperature and residence time have been described herein, it is to be understood that other temperatures can be selected for suitable use with any polymer material in which to form a self-twisted strand 106.

As the yarn 100 exits the oven 112, it passes through a conventional twisting apparatus 114. The twisting apparatus 114 is operative for twisting the yarn 100 to form the self-twisted yarn 106 as best shown in FIG. 2. It is well recognized in the art that a twist occurs when the strand is twisted to form either an s-twist or a z-twist. These twists correspond to clockwise and counter-clockwise twists, and one is the mirror image of the other. An s-twisted yarn will look different than a z-twisted yarn in a weave. In the case of a single yarn, the yarn will twist upon itself in a helix, thereby creating either an s-twist or a z-twist, depending upon the twisting direction. The twisting apparatus 114 may be of any suitable construction such as known in the art where continuous lengths of filaments or strands are twisted.

The self-twisted yarn 106, if heated, may be subject to air-cooling, or optionally, passed through a cooling device 116. The cooling device 116 may include a source of blowing ambient air, or air chilled to aid in bringing the self-twisted yarn 106 to room or ambient temperature. The resulting yarn 106 is subsequently wound upon a spool 118. It is also contemplated that the twisting apparatus 114 may be positioned before the oven 112, as well as providing an oven to heat the yarn 106 after the yarn is wound on the spool 118. It is also contemplated that the twisting apparatus 114 may be placed directly within the oven 112.

The yarn 100 is typically formed by hot extrusion of polymer material through a die. It is therefore contemplated that the yarn 100, while in a somewhat heated state after extrusion, may be twisted in the twisting apparatus 114, thereby eliminating the use of a separate oven 112. Depending upon the exit temperature of the yarn 100 from the extruder, the yarn may be allowed to air cool or provided with a separate cooling device 116 for the yarn prior to twisting.

It is contemplated that only a slight heating of the yarn will allow the yarn to relax sufficiently so as to retain its twisted shape after twisting, e.g., 80-100° F. The heating will provide the yarn with sufficient memory loss to essentially retain its twisted shape. The yarn 106 may be heated prior to or after the twisting operation. In addition, the yarn 106 may be heated as a result of its hot extrusion from an extrusion die during its formation thereby eliminating the need for any subsequent heating as previously described. Although it is preferred that the yarn 106 be heated to reduce some of its memory retention properties, it is not a requirement of the present invention that the yarn 100 be heated prior to weaving the yarn into a woven material for use in an article, such as an article of furniture. In this regard, it is contemplated that the woven material will be heat set in an oven as to be described hereinafter. In another embodiment, the yarn 100 is twisted at room temperature by a filament twisting apparatus and the twisted yarn is then wound to a spool. The twisted yarn 100 is then unwound from the spool into an oven for heat setting. The heat set twisted yarn 100 is subject to air-cooling, or optionally, passed through a cooling device, and rewound to spool.

Figure 5:
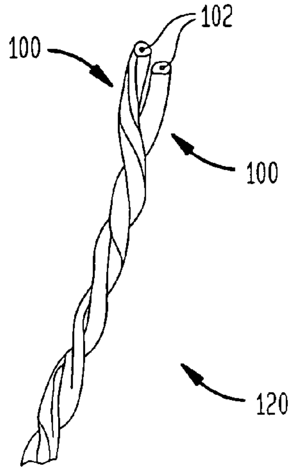
FIG. 5 is a top plan view of a composite yarn formed form twisting multiple strands together in accordance with another embodiment.

Referring to FIG. 5, there is shown a composite twisted yarn of indeterminate length designated generally by reference numeral 120. The composite yarn 120 is made of two yarns 100 of polymer material and can be of the type and construction as described herein which are twisted together. Although the composite yarn 120 has been illustrated as comprising two yarns 100, it is to be understood that the yarn can be constructed from greater than two yarns if so desired. It is not required that the yarns 100 be identical in size, shape, surface, appearance, coloration and/or surface configuration.

Figure 6:
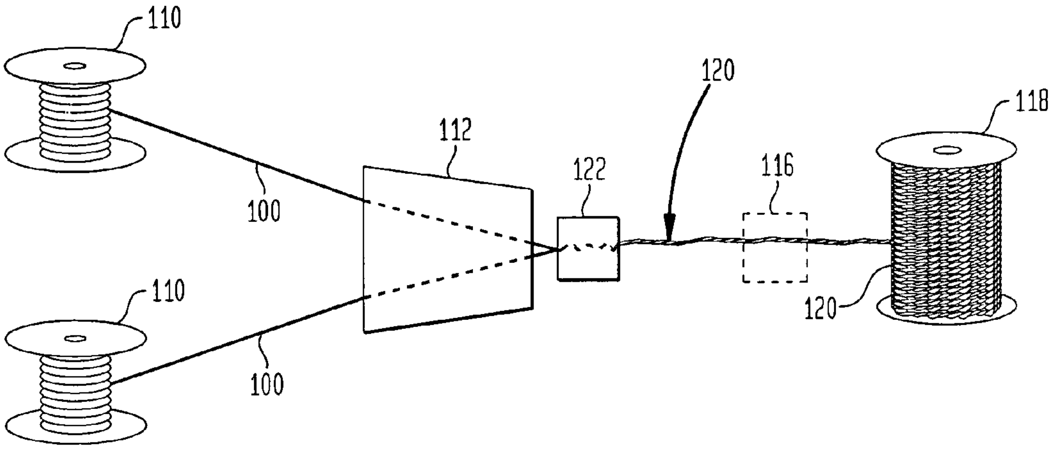
FIG. 6 is a diagrammatic illustration showing one fabrication process for a composite twisted yarn.

Referring now to FIG. 6, there will be described a process of manufacturing a composite twisted yarn 120 in accordance with one embodiment of the present invention, similar to the process of forming the self-twisted yarn 106. As shown, there is provided a source 110 of a continuous length of a yarn 100 of polymer material. A similar source 110 is provided for a continuous length of another yarn 100 of polymer material. Generally, the sources 110 will be in the nature of a spool of an indeterminate length of the yarn 100 of the polymer material.

The individual yarns 100 are fed concurrently from the spools into an oven 112 for heating the yarns to a predetermined temperature whereby the memory characteristics of the yarns are reduced or substantially eliminated. It is also contemplated that the yarns 100 can be heated to a sufficient temperature whereby the yarns will soften so as to at least partially adhere to each other over their outer surface upon cooling. The temperature of the yarns 100 to achieve adhesion therebetween will be higher than required to cause the yarns to lose their memory characteristics. The temperature of the oven 112 will take into consideration the type of polymer material forming the yarns 100, as well as the linear rate in which the yarns pass through the oven for example, the residence time in the oven. Although the process has been described as heating both of the yarns 100, it is contemplated to heat only one of the yarns. The other yarn 100 may be at room temperature or heated to a different temperature in a separate oven.

As the heated yarns 100 exit the oven 112, they pass through a conventional filament twisting apparatus 122. The twisting apparatus 122 is operative for twisting the two yarns 100 together to form the composite twisted yarn 120. The twisting apparatus 122 may be of any suitable construction such as known in the rope art where continuous lengths of filaments are twisted together. Sufficiently heating one of the elongated yarns 100 of polymer material causes the yarns upon twisting to at least partially adhere to one another to prevent their unraveling. However, it is not a requirement that the yarn adhere to each other. The twisting process may occur either before or after the heating process. The heating may take place either in an oven 112 or as a result of the yarns 100 being formed by hot extrusion of the polymer material through a die.

It is also contemplated that the spools 110 of the source yarn may be placed in an oven to preheat the yarn 100 to the desired temperature prior to twisting. It is also contemplated that heating may be provided by placing the twisting apparatus 114 in an oven or arrange suitable heaters around the twisting apparatus, or heating the spools 118 of the composite twisted yarn 120.

It is also contemplated that a slight heating of at least one yarn 100 will allow the yarn to relax so as to twist with an additional yarn, and retain its twisted shape upon cooling. However, it is not a requirement that the yarns 100 be heated when making a composite twisted yarn 120. The composite twisted yarn 120 can be heat set after forming a weave therefrom as to be described hereinafter. It is therefore not a requirement that the yarns 100 be adhered to each other along any portion of their length such as by heating at least one of the strands to about its softening temperature.

The yarns 100, 106 have been described as including a core 102. The present invention specifically contemplates the use of a yarn without a core, woven with a yarn 100, 106 having a supporting core. The manufacture of a yarn with a core 102 often results in slower processing speeds with the attendant increased manufacturing cost. In addition, yarns having a core have limitations as to the shape of the yarn. For example, it is not typically possible to produce a thin flat yarn containing a core. By eliminating the core, additional designs of the yarn can be achieved in the woven material. However, as a coreless yarn generally lacks mechanical strength, it has been discovered that woven panels formed from both coreless and core yarns will provide the necessary strength for use of the woven material in the various articles of furniture and the like as described herein. Previously, it was believed that coreless yarns would not be usable in woven material for certain applications which were load bearing, for example, the seat and backrest portions of an article of furniture.

Figure 7:
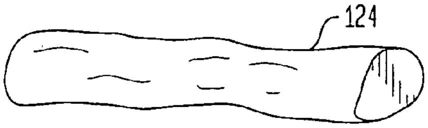
FIG. 7 is a top plan view of a portion of a single strand of polymer yarn in accordance with one embodiment.
Figure 8:
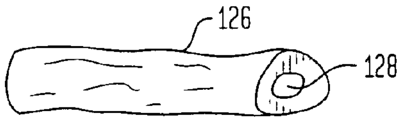
FIG. 8 is a top plan view of a portion of a single strand of polymer yarn in accordance with another embodiment.

As shown in FIG. 7, a coreless yarn 124 may be similar in construction to yarn 100, except for the elimination of the core 102, i.e., having a solid polymer core of the same yarn material. Referring to FIG. 8, coreless yarn 126 is similar to yarn 124, but includes a hollow region 128 or void. The hollow region 128 is devoid of any material. By having a hollow region 128, the coreless yarn 126 may be described as having a body devoid of a core of a material different from the material forming the yarn, as the hollow region is not considered a material, rather a void or the absence of any material. As such, it is contemplated that during the weaving process, the yarn 126 will have a tendency to flatten at certain locations, providing the weave with a different appearance. The hollow region 128 may be of various sizes and will typically extend along the entire length of the yarn 126, and may be centered or off-centered within the yarn 126.

Figure 9:
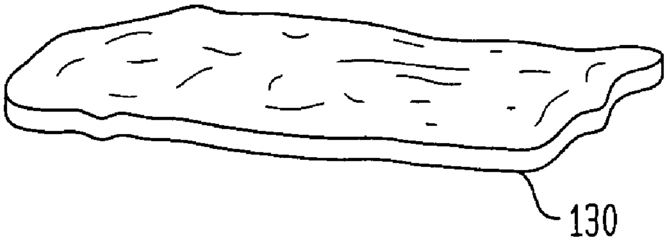
FIG. 9 is a perspective view of a portion of a single strand of polymer yarn in accordance with another embodiment.

Referring to FIG. 9, there is shown a flat coreless yarn 130. By flat, it is meant that the yarn 130 has a thickness to width ration of greater than about 1:2. However, the thickness to width ratio can be as large as desired, for example, 1:5, 1:10, 1:15, etc. The ratio will be dictated by the aesthetic effect desired by the weave resulting form the use of the coreless yarn 130 in combination with yarns having a core 102. It is to be understood that the yarns 124, 126, 130, as yarn 100, may be uniform or non-uniform, may be of any color or multiple colors, and may be of any size. The coreless yarn 130 may also have one or more hollow regions 128 which may be centered or off-centered within the yarn. It is also contemplated that the yarns 124, 126, 130 can be formed from foamed PVC material such that the yarns have a deformed outer surface and a non-uniform cross-section over their entire length. It is also contemplated that other polymers may be used to form the yarns 124, 126, 130, such as polyester and the like.

There will now be described the use of yarns in forming a woven portion. In accordance with one embodiment, a plurality of yarns, twisted or non-twisted and combinations thereof, are woven to form a woven material for forming portions of an article. It is to be understood that furniture and other items such as couches, chairs, rugs, awning and sling material, tables, benches, stools, trunks, mats and the like can be produced in accordance with the teachings of the present invention. It is understood that any combination and construction of yarns as thus far described can be utilized in forming the weave for such an article. Any variation of furniture type and yarn material is contemplated.

Figure 10:
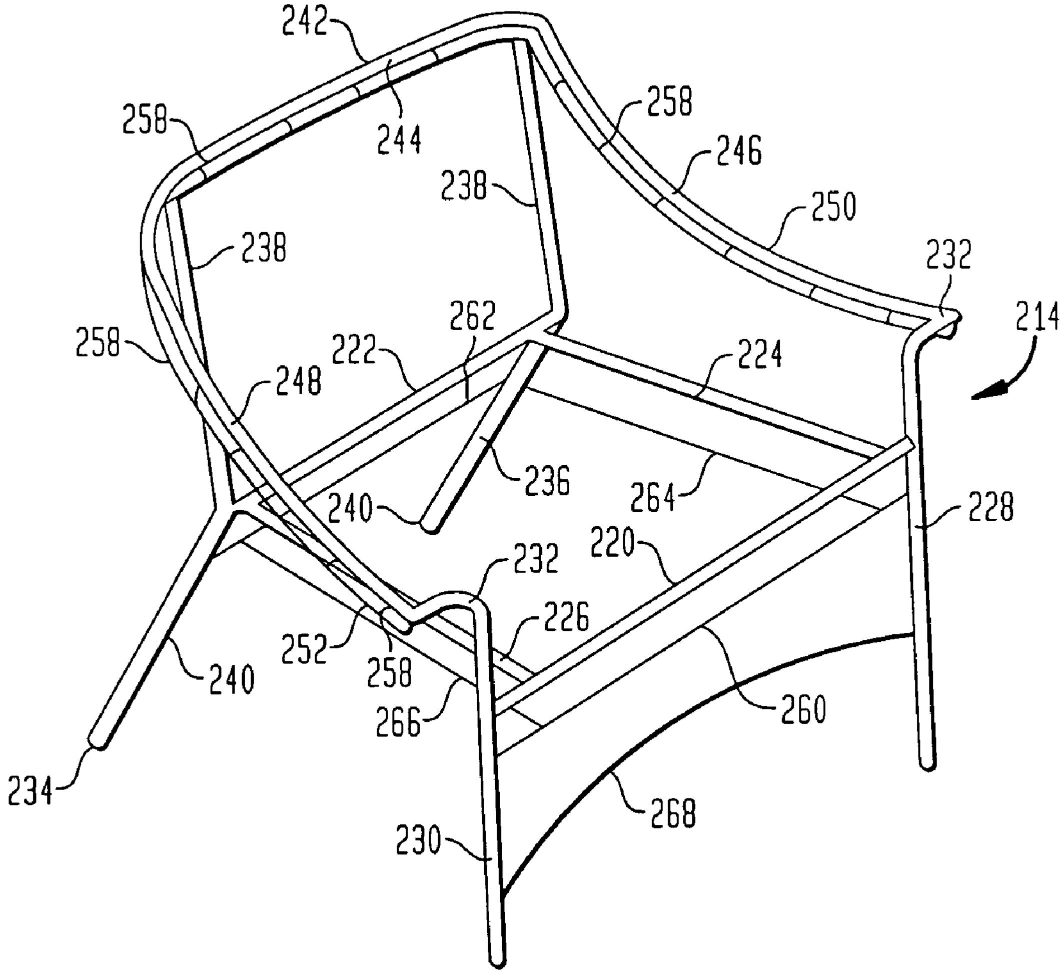
FIG. 10 is a perspective view of a skeletal frame of an article of furniture.
Figure 11:
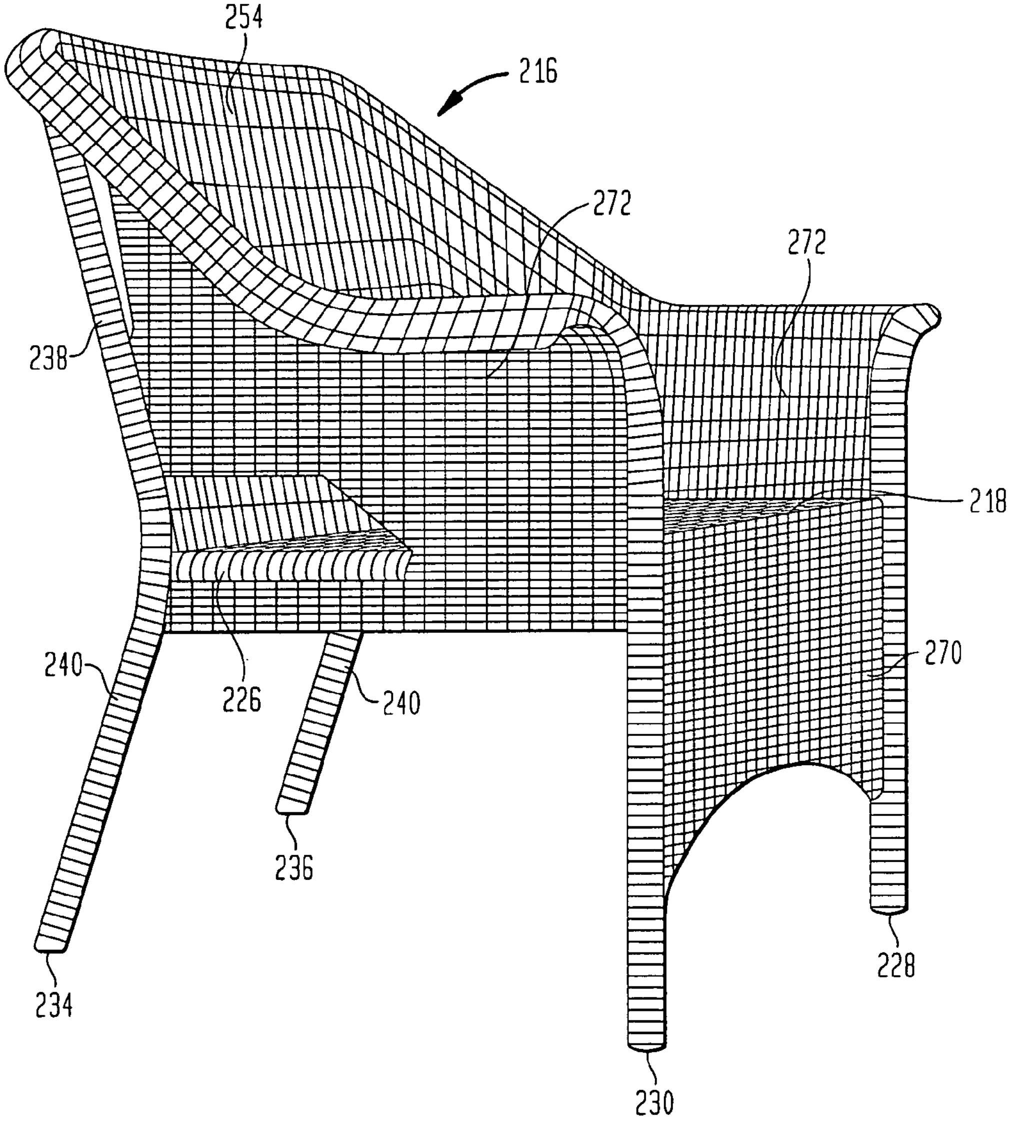
FIG. 11 is a perspective view of an article of furniture including a woven portion of polymer yarn; and, FIG. 12 is a top plan view of woven material constructed by weaving polymer yarn in accordance with an embodiment of the present invention.
Figure 12:
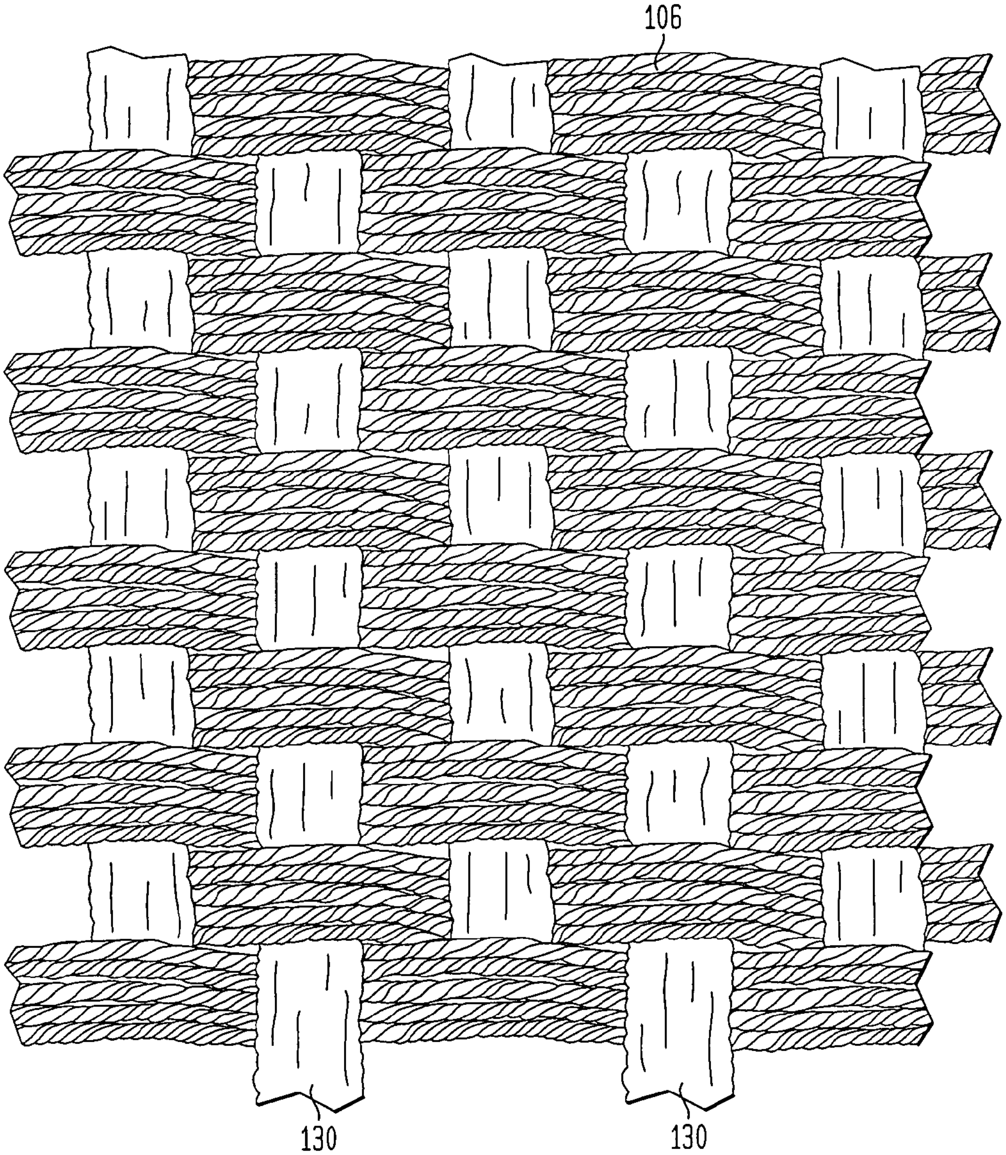

As shown in FIGS. 10 and 11, a chair can be produced from a rigid skeletal frame 214 which will be covered with a weave of woven material produced from a composite weave of yarns of the present invention. The frame 214, by way of illustration only, provides an arm chair with a seat, a back rest, a pair of front legs, a pair of back legs and a pair of side arms. The seat 218 (see FIG. 10) is delineated by a connecting front member 220, a parallel spaced apart back member 222 and a pair of parallel spaced apart side members 224, 226. The front legs 228, 230 are constructed as parallel spaced apart vertical members joined to the free ends of the front member 220 and have outwardly turned extensions 232 providing the front legs with an L-shape. The front legs 228, 230 are arranged generally vertical to the floor as viewed from the front and side of the chair 216.

The back legs 234, 236 are constructed from an angular member attached to the free ends of the back member 222. The back legs 234, 236 have generally parallel spaced apart upper members 238 extending vertically from the back member 222 as viewed from the front and side and generally parallel spaced apart lower members 240. The lower members 240 are arranged at a rearwardly extending angle as viewed from the side and extend generally vertical from the back member 222 as viewed from the rear of the chair 216.

A generally U-shaped member 242 includes a center section 244 connected across the free ends of the upper members 238 of the back legs 234, 236 and a pair of curved spaced apart side arm members 246, 248 forming the side arms 250, 252 of the arm chair. The free ends of the side arm members 246, 248 are attached to the free ends of the extensions 232 of the respective front legs 228, 230. The side arm members 246, 248 are spaced apart wider at their mouth where they connect to the extensions 232 than where they form the center section 244. This arranges the side arms 250, 252 outwardly of the side members 224, 226. The upper members 238 of the back legs 234, 236, the back member 222 and center section 244 delineate the back 254 of the chair 216.

A secondary frame can be used to provide attachment support for the woven material utilized in covering the frame 214. Specifically, a generally U-shaped elongated rod 256 having a shape conforming substantially to the shape of the U-shaped member 242 is connected thereto in underlying relationship by means of a plurality of spaced apart ribs 258. Another secondary support frame is positioned between the front and back legs 228, 230, 234, 236 underlying the seat 218. This secondary frame is constructed from a front rod 260 connected between the front legs 228, 230, a back rod 262 connected between the back legs 234, 236 and a pair of side rods 264, 266 arranged in parallel spaced apart relationship connected between the front rod 260 and back rod 262 inwardly of their terminal ends. An additional front rod 268 may be positioned between the front legs 228, 230 underlying front rod 260.

The frame 214 is covered by weaving, for example, the yarns into a woven material to form panels of woven material directly on the frame, i.e., in situ. The chair 216 can also be fabricated by weaving any of the yarns as described in any combination into pre-woven material panels which are then attached to the frame 214. As shown, the chair 216 includes a seat portion 218, a front skirt portion 270, a back rest portion 254 and side portions 272. The front and back legs 228, 230, 234, 236 may be wrapped with a continuous length of yarn. A plurality of individual yarns are attached to various portions of the frame 214, for example, to the secondary frame as previously described.

In one embodiment, a plurality of individual self-twisted yarns 106 are woven with other yarns, or as they are attached to the frame 214 into a predetermined weave pattern. Some yarns are the weft yarn, while others are the warp yarn, as previously discussed. It is also contemplated that non-twisted yarn 100 and other types of yarn, for example, multiple twisted composite yarns and/or multiple twisted yarns, and those disclosed in the aforementioned applications and patents can be woven together to form such woven material. By combining yarns of various appearance and characteristics, various aesthetic and textural effects can be obtained.

It is contemplated that the core yarns 100, 106 by virtue of their core 102 will provide sufficient strength for the woven material formed therefrom, notwithstanding the absence of a core within the coreless yarns 122, 124, 130 if used in a weave. Generally, it is contemplated that the core yarns 100, 106 will run in the weft direction in the woven material, while the coreless yarns 122, 124, 130 will run in the warp direction, however, this is not a requirement of the present invention. It is further contemplated that a mixture of coreless and core yarns forming the weft and/or warp yarns can be woven into a woven material.

It is further contemplated that a twisted strand can be twisted together with another strand of typically smaller diameter. The smaller diameter strand may be similarly twisted as previously described or may be untwisted. It is further contemplated that a plurality of smaller diameter strands may be twisted together with one or more twisted strands. The aforementioned strands may be of different coloration, surface appearance, and configuration, such as having projections 206, 208 and the like. By combining strands of various characteristics, various aesthetic and textural effects can be obtained. The single twist strands can form the weft or warp yarns in a woven material. The other strands, i.e., weft or warp stands can be formed of other polymer strands, for example, multiple strands of twisted yarn as described with respect to the aforementioned applications or patents. In multiple twist stands, it is not required that the individual strands be of the same diameter. Accordingly, it is contemplated that a larger diameter strand can be twisted together with one or more smaller diameter strands. In this case, it is contemplated by way of example, that the small diameter yarns are not required to have a core, which will be present in the larger diameter yarn. As such, the core in the larger diameter yarn will provide the necessary physical strength for the resulting twisted yarn. However, it is contemplated that the smaller diameter yarns may also have a core of smaller size than the core in the larger diameter yarn. Collectively, the number of cores and their respective size will provide the requisite strength for the composite twisted yarn.

In a further embodiment of the present invention, a weave of woven material may be formed from weft and warp yarns, which have flat and/or generally cylindrical shape. For example, the weft or warp yarn may be formed from a plurality of generally flat polymer yarn 130 such as those disclosed in U.S. Pat. No. Des. 474,614, woven in combination with one or more generally cylindrical yarns such as those disclosed in any one of the aforementioned applications and patents. The individual cylindrical yarns may be twisted or non-twisted, and similarly, the flat yarn may be twisted or non-twisted. The flat yarn may also be foamed or non-foamed and provided with a core 102 as previously described. However, flat yarns generally are not of sufficient size to accommodate a core, or one which will provide the strand with sufficient strength. Hence, it is contemplated that the core yarn by virtue of its core 102 will provide sufficient strength for the woven material formed therefrom, notwithstanding the absence of a core with in the flat yarn. Generally, it is contemplated that the cylindrical yarns will run in one direction in the woven material, while the flat yarns will run in the other direction, i.e., being either the weft or warp yarns. However, it is further contemplated that a mixture of flat and cylindrical yarns forming the weft and/or warp yarns can be woven into a woven material.

It is known that the individual yarns can shift within the weave during use of the chair 216. Heat setting the woven material on the chair 216 aids in preventing the yarns from shifting within the different portions of the chair. The entire chair 216 with the woven portion attached can be placed into an oven similar to oven 112 in order to heat set the attached woven material similar to that used in the production of the composite twisted yarn 120. In the case of the chair 216, it is contemplated that the oven will be a batch oven, as opposed to a continuous oven 112 as described with respect to the manufacture of the composite twisted yarn 120. In this regard, the oven will typically be of sufficient size to hold a plurality of chairs 216. The chairs 216 will remain in the oven 112 at a predetermined temperature for a predetermined residence time to cause the yarns to heat set whereby contiguous portions of the yarn may bond together within the weave when the chair is removed from the oven and allowed to cool. The cooling process may take place either within the oven or outside the oven by being subjected to ambient air. In addition, it is also contemplated that a source of chilled air may be blown over the heated chairs 116 either in a confined housing or in an open area. The temperature and residence time for the oven for heat setting the woven polymer material are similar to those as thus far described with respect to the twisted strands.

The heat setting process stabilizes the weft and warp yarns to inhibit their shifting within the weave, as well as heat setting individual yarns which may be used as the weft and warp yarns. It has been discovered that heat setting of the woven material using certain polymer yarns causes the woven material to sag thereby detracting from the aesthetic appeal of the article. By using self-twisted yarns 106 as either the weft or warp yarns, either alone or in combination with other yarns as described herein, it has been discovered that sagging is substantially eliminated during the heat setting process of the woven polymer material. As such, the use of the self-twisted yarns 106 of the present invention has been found to overcome the sagging problem of the seat and backrest portions of the furniture articles incurred when heat setting other woven material.

Although in accordance with the preferred embodiment, the woven material is formed in situ on the frame, it is contemplated that panels of pre-woven material may be adhered to the frame and subsequently heat set by placing the article of furniture in an oven as thus far described. It is therefore contemplated that portions of the article of furniture may be formed with woven material in situ, other portions by attaching panels of pre-woven material thereto, as well as variations thereof. In any event, the article of furniture can be placed in an oven to heat set the woven material. It is also contemplated that pre-woven material may be placed in an oven for heat setting, prior to adherence to the article of furniture, thereby doing away with the need to heat set the entire article of furniture.

An example of a process for bonding or adhering woven strands of PVC material together without the application of heat can be achieved by the application of a suitable paint composition, and optionally, followed by application of a fluid material having thinner or solvent-like properties for the paint composition. The method according to one embodiment generally utilizes various known paint compositions which are suitable for coating PVC material, e.g., paint compositions having adhesion properties to PVC material; and thinners for use with such PVC paint compositions and/or solvents for the PVC material. While specific examples of PVC paint compositions are described below, it is recognized that other known compositions for adhering to PVC material can be used. Paint compositions are those which include a film forming component, a color component and at least one solvent or thinner. In PVC paint compositions, the film forming component can be PVC material. In one embodiment, examples of paints suitable for coating PVC material have the following chemical compositions:

| Compound: | Wt. % |
|---|---|
| Thermoplastic Acrylic Resin | 55-65 |
| Color | 18-22 |
| Dispersant | 0.4-0.6 |
| Defoamer | 0.1-0.3 |
| Plasticizer Agent | 3-5 |
| Anti-Settling Agent | 0.2-0.4 |
| Solvents | 20-Oct |

EXAMPLE 1

| Compound: | Wt. % |
|---|---|
| Methyl Ethyl Ketone | 5.3 |
| Methyl Ethyl Butyl Ketone | 58.6 |
| Cyclohexanone | 12.9 |
| 1-Methoxy 2-Propyl Acetate | 3.3 |
| Ethyl 3 Ethoxypropionate | 4.96 |
| Vinyl Acrylic Ester Copolymer | 3.98 |
| Acrylic Copolymer | 9.49 |
| Methyl Methacrylate | 0.12 |
| Butyl Benzyl Phthalate | 0.99 |
| Pentamethylpiperidine | 0.2 |
| Cellulose Acetate Butyrate | 0.5 |
| Polyether Modified Methyl | 0.2 |
| Polysiloxane | — |
| Pigments | — |

EXAMPLE 2

Paint compositions suitable for coating PVC material are well known in the art. An additional example is Krylon® Fusion manufactured by the Krylon Product Group which is part of the Sherwin Williams Company. It is contemplated that other such paint compositions suitable for coating PVC material can be used. Typically, such paint compositions contain solvents suitable for use with PVC material. Examples of such solvents include toluene, tetrahydrofuran, and ketones including methyl ethyl ketone, cyclohexanone and acetone. It is contemplated that the thinners and the solvents suitable for use in the present invention may be the same composition. In many cases, chemical compositions present in PVC cements are also utilized in PVC paint compositions. It is contemplated that other solvents and chemical compositions can be included in compositions suitable for coating PVC material. Further, where the woven material is of other than PVC polymer material, suitable paints and thinners therefore or solvents for the selected polymer would be used in accordance with the present invention.

In conjunction with the above-discussed PVC paint compositions, one suitable thinner or solvent for use in the method is acetone. In a preferred embodiment, acetone is used in conjunction with the above-described compositions of examples 1 and 2. It is contemplated that other thinners or solvents known in the art can be used with the above examples such as those described above, as well as with other coatings.

In one embodiment, woven material is formed which includes PVC yarns of any configuration or design, such as twisted or non-twisted. The woven material is coated with a PVC paint composition using any suitable coating technique such as spray painting. Before the coating on the woven PVC material has dried, a cloth or other material, soaked or saturated with a thinner or solvent according to that described above, is wiped across all surfaces of the painted woven PVC material. This removes a portion of the PVC paint applied in the painting step and partially saturates the crevasses or interstices of the woven PVC material with the thinner or solvent in combination with the residual PVC paint. It is also contemplated that the solvent can be applied by spraying, with or without wiping or removing any of the PVC paint previously applied. Where wiping of the PVC paint is not performed, the woven material will only have a minor, if any, washed-out appearance.

After drying of the PVC paint and solvent, this process causes contiguous portions of the yarns within the woven portions to bond together, thereby accomplishing generally the same result as described above without the need for subjecting the woven PVC material to heat setting. It is also contemplated that the finished coated woven PVC material can be heated to evaporate any residual thinner or solvent, which will also eliminate any residual odor and further enhance the bonding process. Heating can be accomplished if desired in an oven at a low temperature, e.g., below about 250° F., which will also cause the yarns to heat set. The lower temperatures prevent the polymer yarns from obtaining a shiny look when heat set at higher temperatures. The additional heat set can also be accomplished after air drying the PVC paint.

Although it is preferred that a thinner or solvent be applied to the painted woven PVC material, this is not a requirement of the present invention. In this regard, the PVC paint composition upon drying in the crevasses or interstices of the woven material will itself bond the yarns together in a similar affect as heat setting the woven PVC material. It is contemplated that the use of the thinner or solvent will help the PVC paint composition penetrate into the crevasses, as well as acting as an additional bonding agent for the PVC material. However, it is also contemplated that this method of applying PVC and non PVC paint and solvent or thinner can also be practiced on polymer woven panels that have previously been heat set with the yarns already adhering to one another. In this regard, the PVC or non PVC paint will coat the yarns and fill in any interstices therebetween as previously described. By wiping off a portion of the paint coating with solvent or thinner, a washed out look can also be obtained.

Additionally, while the preferred embodiment uses spray painting, it is contemplated that other methods of applying such paint, known to those skilled in the art, can be performed. It is also contemplated that other apparatus can be utilized to apply the thinner or solvents to the woven material. Such apparatus can be manually operated, or in another embodiment, can be adapted to be operated mechanically. Likewise, it is also contemplated that the time required for the drying of both the paint and the thinner may vary according to the amount or method of applying the substances, as well as drying temperature.

This method of applying PVC paint and partially removing it with thinner or solvents also creates a unique aesthetic washed-out look upon the painted portions of the woven material which are non-uniformly coated with the PVC paint. This washed-out look can be accomplished utilizing the PVC paint discussed above, and also by the use of any paint suitable for covering the polymer yarns. Typical non PVC paints, that may generally have lesser adhesion to PVC material or the like, will also allow for a washed-out look area, but will not form as strong a bond of the woven portion as previously described. The PVC paint thinner or PVC solvent helps the non-PVC paint to adhere to the PVC strands. The washed-out look is both aesthetically pleasing and beneficial by allowing different colored articles of furniture to be manufactured from the same stock of synthetic yarn. The color no longer depends exclusively upon the color of the yarn, which is typically a generic color such as black, brown, green or white, but rather upon the combination of the color of the paint utilized and the color of the yarn. Additionally, the washed-out look area is not a typical solid color, but rather a discontinuous shade consisting of the color of the yarn and the color of the paint. It is contemplated that different combinations of quantities, paint colors and types of paint thinner will provide different washed looks. For example, in another embodiment, vast quantities of paint can be applied in order to manufacture an article of furniture that is closer in color to that of the color of the paint. It is also contemplated to apply multiple colors of paint to the woven material to obtain the desired color effect.

In a preferred embodiment, this method is performed on a chair 116 that is constructed in accordance with the disclosure herein. However, it is contemplated that different articles of furniture can be utilized having different style weaves and/or material strands. While material like twisted yarn strand 100, 200 can be employed, it is also recognized that other material, for example multiple strand twisted yarn and non-twisted strands, as disclosed in Applicant's application Ser. No. 10/158,629 and patents, can also be bonded or fused through this method. In other words, the method of bonding together a plurality of yarn strands, utilizing paint and thinner or solvent can be performed on various yarn materials or constructions.

It is also contemplated that paint compositions suitable for coating polymer yarns in woven material of other than PVC material can be used. Polymers having properties different than that of PVC have suitable paint coatings known in the art and such combinations can be utilized in accordance with the present invention.

Although the invention herein has been described with reference to particular embodiments, it is to be understood that these embodiments are merely illustrative of the principles and application of the present invention. It is therefore to be understood that numerous modifications may be made to the illustrative embodiments and that other arrangements may be devised without departing from the spirit and scope of the present invention as defined by the appended claims.

The invention claimed is:

1. An article of furniture comprising a frame having the shape of an article of furniture, and a woven panel having an exposed outer surface attached to said frame, said woven panel comprises a plurality of synthetic polymer first yarns woven together with a plurality of synthetic polymer second yarns forming said woven panel therefrom, said first and second yarns having an outer surface and interstices therebetween within said woven panel, a wash adhered to at least a portion of said exposed outer surface of said woven panel and within said interstices, said wash including a polymer component and a color component, said first and second yarns within said woven portion being bonded to each other by said polymer component within said interstices.

2. The article of claim 1, wherein said polymer of said first and second yarns comprises PVC material.

3. The article of claim 2, wherein said wash comprise a composition having adhesion properties for PVC material.

4. The article of claim 3, wherein said composition includes at least one component selected from the group consisting of a solvent and a thinner.

5. The article of claim 1, wherein said wash covers substantially the entire outer surfaces of said first and second yarns.

6. The article of claim 1, wherein said first and second yarns each have a color different from the color of said wash.

7. The article of claim 1, wherein said first yarn comprises a single twisted yarn.

8. The article of claim 1, wherein said first yarn comprises a plurality of yarns twisted together.

9. The article of claim 1, wherein said wash includes a solvent for PVC material.

10. The article of claim 9, wherein said solvent is selected from the group consisting of toluene, tetrahydrofuran, cyclohexanone, ketones and mixtures thereof.

11. The article of claim 1, wherein said wash includes a film forming component comprising PVC material.

12. The article of claim 1, wherein said wash non-uniformly covers said exposed outer surface of said woven panel.

13. The article of claim 1, wherein said color component has a color different from the color of one of said plurality of polymer first and second yarns.

14. The article of claim 1, wherein said first and second yarns within said woven portion are adhered to each other along contiguous portions thereof.

15. An article of furniture comprising a frame having the shape of an article of furniture, and a woven panel having an exposed outer surface attached to said frame, said woven panel comprises a plurality of synthetic polymer first yarns having a first color woven together with a plurality of synthetic polymer second yarns having a second color forming said woven panel therefrom, said first and second yarns having an outer surface and interstices therebetween within said woven panel, a wash adhered to at least a portion of said exposed outer surface of said woven panel and within said interstices, said wash including a polymer component and a color component having a third color substantially different from at least one of said first and second colors, said first and second yarns within said woven portion being bonded to each other by said polymer component within said interstices; wherein at least the outer surface of said polymer first yarns, at least the outer surface of said polymer second yarns and said polymer component comprise the same polymer.

16. The article of claim 15, wherein said polymer of said first and second yarns and said polymer component comprise PVC material.

17. The article of claim 15, wherein said wash covers substantially the entire outer surfaces of said first and second yarns.

18. An article of furniture comprising a frame having the shape of an article of furniture having a seat portion and a backrest portion, and a woven panel having an exposed outer surface attached to said frame forming at least one of said seat portion and said backrest portion, said woven panel comprises a plurality of synthetic polymer first yarns having a first color woven together with a plurality of synthetic polymer second yarns having a second color forming said woven panel therefrom, said first and second yarns having an outer surface and interstices therebetween within said woven panel, a wash adhered to said exposed outer surface of said woven panel and within said interstices, said wash including a polymer component and a color component having a third color substantially different from at least one of said first and second colors, said first and second yarns within said woven portion being bonded to each other by said polymer component of said wash within said interstices; wherein at least the outer surface of said polymer first yarns, at least the outer surface of said polymer second yarns and said polymer component comprise the same polymer.

19. The article of claim 18, wherein said polymer of said first and second yarns and said polymer component comprise PVC material.

20. The article of claim 18, wherein said wash covers substantially the entire outer surfaces of said first and second yarns.

21. The article of claim 1, wherein at least one of said first and second yarns has a color different from the color of said wash.

22. The article of claim 21, wherein the color of a portion of said outer surface of said first and second yarns is visible within said woven panel.

23. The article of claim 1, wherein said plurality of first and second yarns are unadhered to each other in said woven panel other than by said wash within said interstices.

24. An article of furniture comprising a frame having the shape of an article of furniture adapted for use in an outdoor environment having a seat portion and a backrest portion, and a woven panel having an exposed outer surface attached to said frame, said woven panel forming at least one of said seat portion and said backrest portion, said woven panel comprising a plurality of PVC first yarns woven together with a plurality of PVC second yarns forming said woven panel therefrom, said first and second yarns having a colored outer surface and interstices therebetween within said woven panel, a wash adhered to at least a portion of said exposed outer surface of said woven panel and within said interstices, said wash including a PVC component and a color component, said first and second yarns within said woven portion being bonded to each other by said PVC component within said interstices, wherein the color of a portion of said outer surface of said first and second yarns is visible within said woven panel.

25. The article of claim 24, wherein said first and second yarns each have a color different from the color of said wash.

26. The article of claim 24, wherein said first yarn comprises a single twisted yarn.

27. The article of claim 24, wherein said first yarn comprises a plurality of yarns twisted together.

28. The article of claim 24, wherein said wash non-uniformly covers said exposed outer surface of said woven panel.

29. The article of claim 24, wherein said plurality of first and second yarns are unadhered to each other in said woven panel other than by said wash within said interstices.

* * * * *

UNITED STATES PATENT AND TRADEMARK OFFICE

CERTIFICATE OF CORRECTION

PATENT NO. : 7,472,961 B2
APPLICATION NO. : 10/902556
DATED : January 6, 2009
INVENTOR(S) : Larry Schwartz et al.

It is certified that error appears in the above-identified patent and that said Letters Patent is hereby corrected as shown below:

At Column 2, line 9, please replace "Is" after "There" with -- are --.

At Column 2, line 29, please replace "disclose" with -- discloses --.

At Column 3, line 65, please replace "form" with -- from --.

At Column 6, line 3, after "properties", please insert a -- , -- replace "For" with --for--.

At Column 7, line 59, please replace "yarn" with -- yarns --.

At Column 15, line 14, please replace "comprise" with -- comprises --.

Signed and Sealed this
First Day of February, 2011

David J. Kappos
*Director of the United States Patent and Trademark Office*